Oct. 15, 1957     C. H. YOUNGBERG     2,809,870
WHEEL MOUNTING
Filed Aug. 31, 1953
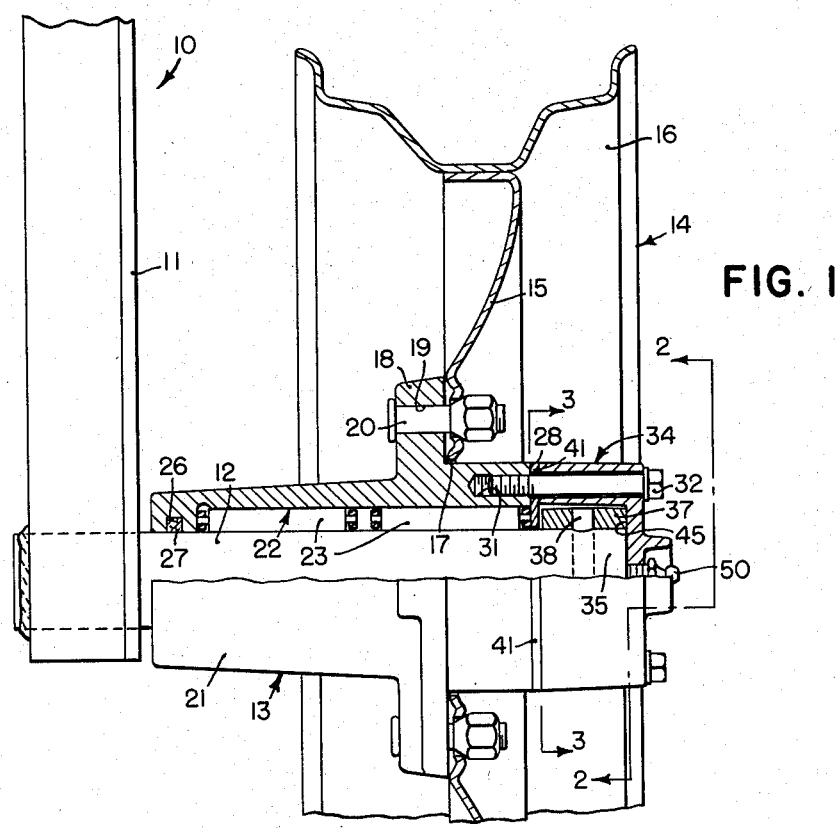
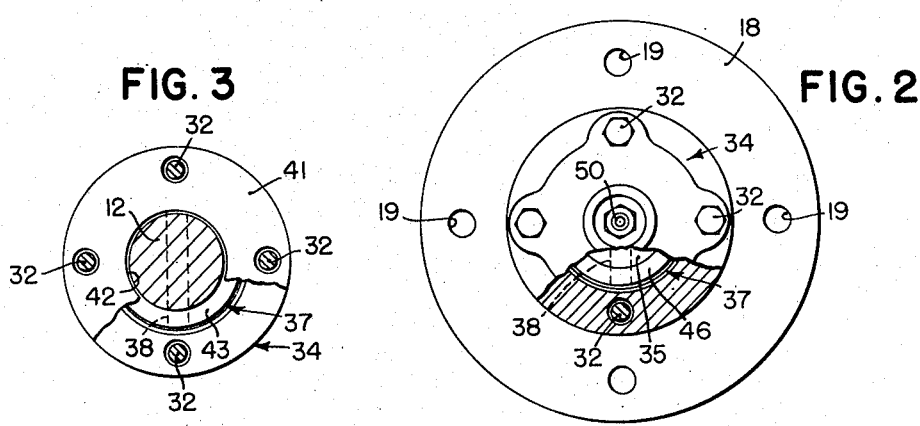
INVENTOR.
CHARLES H. YOUNGBERG
BY
ATTORNEYS United States Patent Office 2,809,870
Patented Oct. 15, 1957

2,809,870

WHEEL MOUNTING

Charles H. Youngberg, Moline, Ill., assignor to Deere & Company, Moline, Ill., a corporation of Illinois Application August 31, 1953, Serial No. 377,487

4 Claims. (Cl. 301—111)

The present invention relates generally to a wheel and axle construction, particularly adapted for agricultural implements and is especially concerned with means for sustaining the laterally inwardly and outwardly directed thrusts usually encountered in agricultural use, the construction being such that there is substantially no possibility of dirt, dust and the like working its way into contact with the thrust-resisting surfaces.

Another important feature of the present invention is the provision of axially directed thrust-resisting means that is totally enclosed at one end of the wheel hub, with the other end of the wheel hub having sealing means that cooperates with the associated supporting shaft, there being no way whereby dirt, dust or the like can gain access to the thrust-resisting surfaces except through the aforesaid sealing means and substantially the entire length of the bearing means.

Another feature of this invention is the provision of a hub and bearing construction that accommodates the use of detachable wheel bodies, with well protected thrust-resisting surfaces that do not interfere with the passage of the wheel body onto and off of the hub receiving it.

Specifically, it is a feature of this invention to provide a hub construction particularly arranged to accommodate the use of anti-friction roller bearings or the like with associated thrust-resisting means carried at one end thereof and substantially entirely enclosed against the entrance of dirt, dust and the like but which does not interfere with the use of conventional wheel bodies having relatively small hub-receiving openings.

These and other objects and advantages of the present invention will be apparent to those skilled in the art after a consideration of the following detailed description, taken in conjunction with the accompanying drawings in which the preferred structure has been shown by way of illustration.

In the accompanying drawings:

Fig. 1 is a vertical sectional view of a wheel and mounting incorporating the principles of the present invention.

Fig. 2 is a view taken generally along the line 2—2 of Fig. 1, with the detachable wheel removed to show the hub construction.

Fig. 3 is a fragmentary sectional view taken generally along the line 3—3 of Fig. 1.

Referring now to the drawings, particularly Fig. 1, the reference numeral 10 indicates a portion of an agricultural implement that includes a generally vertically extending support 11 to which the laterally inner end of a generally stationary axial shaft 12 is fixed, as by welding. The axle shaft 12 receives and supports a wheel hub assembly or construction 13, and the latter detachably receives a demountable wheel body 14, which may per se be of conventional construction, embodying a disk-like web 15 and a tire-receiving rim 16. The central portion of the disk section 15 is apertured, as at 17, to pass over the laterally outer portion of the hub assembly 13 and into position against a flange 18 secured to or formed as a part of the hub of the wheel. The flange 18 is apertured, as at 19 (Fig. 2), to receive studs or bolts 20 by which the outer wheel body 14 is adapted to be connected to the hub assembly 13.

The hub assembly 13 includes a generally cylindrical hub member 21 having an interior chamber 22 that is adapted to receive anti-friction means preferably in the form of a pair of roller bearing units 23, those shown in the drawings by way of illustration only being of the type that does not resist axially directed thrust forces. The axially inner end of the hub member 21 is recessed, as at 26, to receive sealing means 27 acting between the inner end of the hub and the associated axle 12 to prevent the entrance of dirt, dust and the like into the interior of the hub.

The laterally outer portion of the hub member 21, that is, laterally outwardly of the wheel-receiving flange 18, is generally of cylindrical configuration, having an outside diameter such as to snugly receive the wheel body opening 17, but with sufficient looseness to accommodate the ready application or removal of the wheel body from the hub assembly 13. The outer end, indicated at 28, of the hub member 21 is flat and lies in a radial plane, the hub member being of sufficient radial thickness to accommodate a plurality of tapped openings 31 into which the inner ends of a plurality of machine bolts 32 or the like are received. The end 28 of the hub member 21 receives a cap member 34 that is formed so as to enclose the laterally outer end 35 of the stationary shaft 12. The latter extends laterally outwardly of the outer end 28 of the hub member to receive a thrust collar 37 that is fixedly secured to the axle shaft 12 by any suitable means, such as a locking pin 38. A hardened thrust-resisting ring 41 is apertured to receive the machine bolts 32, corresponding to the tapped openings 31, and is of such radial dimension that the inner portion 42 of the thrust ring 41 lies just out of contact with the axle shaft 12 but in a position not only to prevent axially outward displacement of the bearing units 23 but also to bear against the axially inner face 43 of the thrust collar 37. The cap member 34 is provided with an axially inwardly facing thrust-transmitting portion 45 which bears against the laterally outer face of the thrust collar 37. The dimensions of the several parts are so chosen that when the bolts 32 are tightened, securing the cap member 34 and the thrust ring 41 to the outer end of the hub member 21 in lubricant-tight relation, laterally outward displacement of the wheel hub and associated parts is prevented by the contact of the outer face of the thrust ring 41 against the inner face 43 of the thrust collar 37, and laterally inward displacement of the wheel and hub is prevented by contact of the hub cap portion 45 with the outer face 46 of the thrust collar 37. It will be noted that the contacting thrust-resisting surfaces are all enclosed in the cap member end of the hub assembly and that the only possible way for dirt, dust and the like to reach the thrust surfaces is past the seal 27 and entirely through the interior chamber 22 of the wheel hub. However, forcing lubricant into the chamber 22, as through a grease fitting 50 (Fig. 1), to lubricate the bearing units 23 has the effect of forcing any dirt, dust and the like that may work into the bearings laterally outwardly past the seal 27. Thus, according to the principles of the present invention, I have provided a wheel structure in which the thrust-resisting surfaces are substantially completely isolated from any possible contact of dirt, dust and the like.

It will also be noted that by the use of the thrust ring 41, the outside diameter of the outer end of the hub member 21 may be kept down to a minimum, being thereby adapted to receive a wheel body member 14 having a relatively small center opening 17, it being required only that the thickness of the outer end of the hub member, outside the bearings 23, be sufficient to provide stock for the tapped bolt-receiving openings 31.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a wheel and axle construction for agricultural implements of the type including a frame and means providing a shaft extending axially outwardly therefrom and upon which the wheel is journaled for rotation, the improvement comprising a wheel hub rotatably mounted on the shaft and having a generally radially outwardly extending flange adapted to receive the central opening of a demountable wheel; an annular thrust-resisting collar member fixed to the outer end of said shaft adjacent the laterally outer end of said hub; a cap member attached to the laterally outer end of said hub and enclosing the collar member and the outer end of the shaft, said cap including a portion acting against said thrust-resisting collar member for preventing axial displacement of the hub and wheel in one direction; and a thrust ring clamped between the cap member and the outer end of said hub and extending from its clamped portions radially inwardly and lying against the inner face of said collar member for preventing axial movement of the hub and wheel in the other direction.

2. The invention defined in claim 1, further characterized by: the collar member having inner and outer radial faces; said portion of the cap including a faced section abutting the outer radial face of the collar member; said thrust ring including an inner radial face positioned adjacent to the hub and an outer radial face adjacent to the inner face of the collar member and extending outwardly therefrom; and the cap having an inner radial face lying adjacent to the outer face of the thrust ring, said hub, said ring, and said cap cooperating upon the ring being clamped to seal the collar member from outside matter.

3. The invention defined in claim 1, further characterized by the thrust ring having an outside diameter substantially the same as the outer end of the hub; and the cap member having an outside diameter substantially the same as the outer end of the hub and thrust ring, said cap, ring, and hub thereby providing an outer smooth cylindrical surface for receiving the central opening of the wheel.

4. The invention defined in claim 3, in which the thrust ring, cap, and hub have axially extending and registrable openings, and said ring is clamped in position by axial bolt means extending through said openings.

References Cited in the file of this patent

UNITED STATES PATENTS

| | | |
|---|---|---|
| 1,366,211 | Pratt | Jan. 18, 1921 |
| 1,369,541 | Purdy | Feb. 22, 1921 |
| 1,516,066 | Thomas | Nov. 18, 1924 |
| 1,581,476 | Sanford | Apr. 20, 1926 |
| 2,220,284 | Roemer | Nov. 5, 1940 |
| 2,600,768 | Heth | June 17, 1952 |